(12) United States Patent
Kamida et al.

(10) Patent No.: US 6,474,741 B2
(45) Date of Patent: Nov. 5, 2002

(54) SEAT

(75) Inventors: Koji Kamida; Masayuki Kaneko, both of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/834,161

(22) Filed: Apr. 12, 2001

(65) Prior Publication Data

US 2001/0040400 A1 Nov. 15, 2001

(30) Foreign Application Priority Data

May 12, 2000 (JP) ........................................ 2000-140961

(51) Int. Cl.$^7$ ................................................ B60N 2/20
(52) U.S. Cl. ..................... 297/378.12; 297/94; 297/335; 297/354.13
(58) Field of Search ....................... 297/92, 94, 354.13, 297/335, 378.12

(56) References Cited

U.S. PATENT DOCUMENTS

| 2,004,850 A | 6/1935 | Bugatti |
| 2,694,814 A | 11/1954 | Doner |
| 3,379,471 A | 4/1968 | Dalziel |
| 3,529,863 A | 9/1970 | Belfry |
| 3,695,688 A | 10/1972 | Wize |
| 3,743,350 A | 7/1973 | Allen |
| 3,844,608 A | 10/1974 | Freedman |
| 3,964,785 A | 6/1976 | Plume |
| 4,168,860 A | 9/1979 | Garza et al. |
| 4,484,776 A | * 11/1984 | Gokimoto et al. ...... 297/378.13 |
| 4,779,917 A | 10/1988 | Campbell et al. |
| 5,156,438 A | 10/1992 | Hayakawa et al. |
| 5,322,341 A | 6/1994 | Harrison et al. |
| 5,362,124 A | 11/1994 | Schlidt |
| 5,393,116 A | * 2/1995 | Bolsworth et al. ...... 297/378.12 |
| 5,551,750 A | 9/1996 | Yoshimura |
| 5,800,015 A | * 9/1998 | Tsuchiya et al. ............ 297/335 |
| 5,934,749 A | 8/1999 | Pond et al. |
| 6,082,805 A | 7/2000 | Gray et al. |
| 6,139,100 A | 10/2000 | Baskin-Lockman et al. |
| 6,203,104 B1 | * 3/2001 | Matsuo et al. ............... 297/335 |

FOREIGN PATENT DOCUMENTS

JP          11005474           1/1999

\* cited by examiner

*Primary Examiner*—Peter R. Brown
(74) *Attorney, Agent, or Firm*—Merchant & Gould, P.C.

(57) ABSTRACT

A seat includes a seat supporting carrier. A seat cushion is pivotally mounted on the carrier. The carrier has a swing arm pivotally attached thereto. A seat back is pivotally mounted to the swing arm. The seat cushion is pivotable on a first pivot axis P1 between a laid position and an erected position. The swing aim is pivotable on a second pivot axis P2 between a laid position and and erected position. The seat back is pivotable on a third pivot axis between a laid position and an erected position. When the seat back is in the erected position and the seat cushion is in the laid position, the third pivot axis is positioned higher than the first and second pivot axes. The seat back, by pivoting from the erected position to the laid position, lies on the seat cushion held in the laid position.

7 Claims, 10 Drawing Sheets

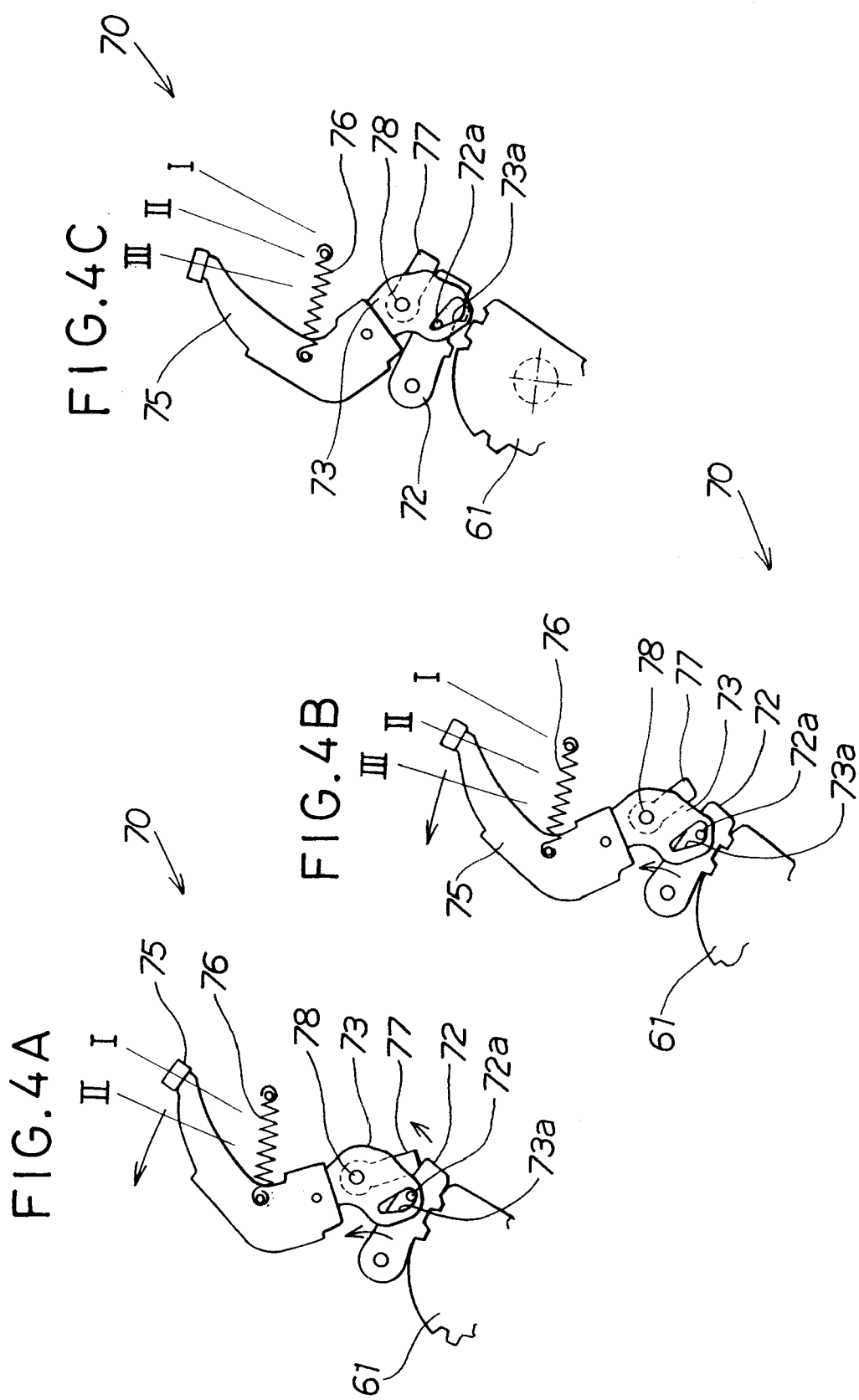

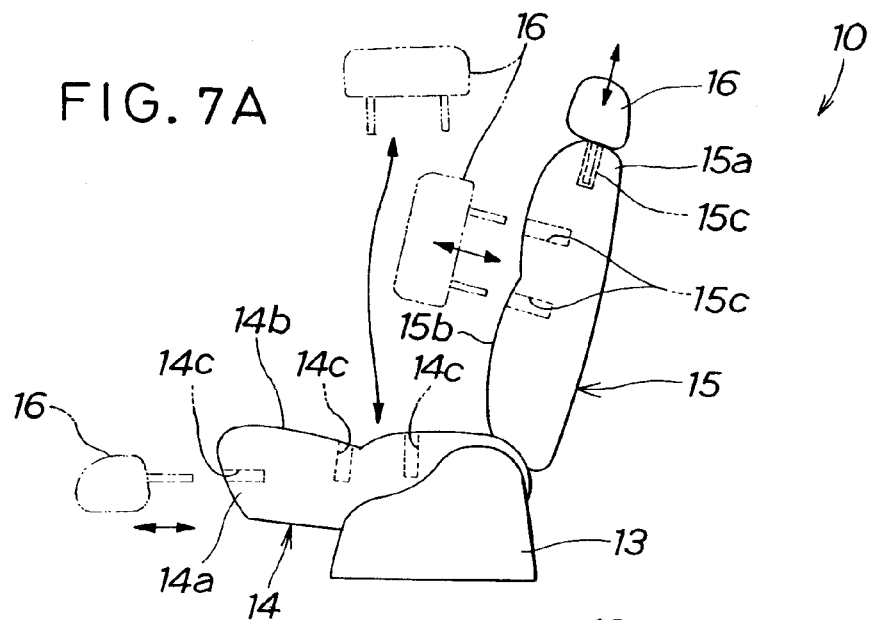
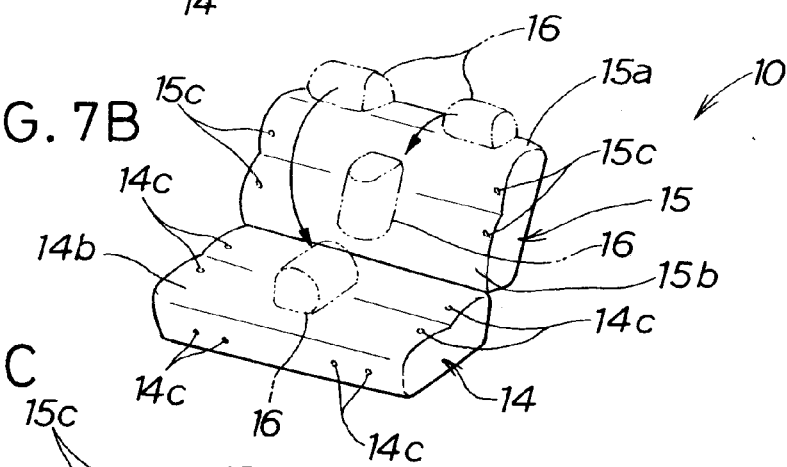
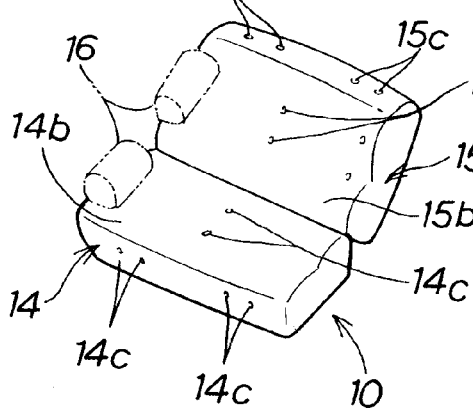
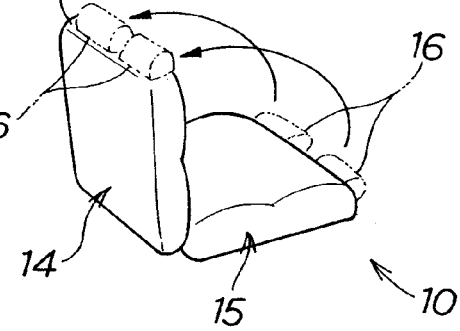

SEAT

BACKGROUND OF THE INVENTION

1. Field of the Invention

The present invention relates to an improvement in a seat designed to pivot between a forward-facing position and a rear-facing position.

2. Description of the Related Art

Known seats for vehicles such as vans, buses, trains are pivoted between forward-facing positions and rear-facing positions. Such seats are known from Japanese Laid-Open Publication No. HEI 11-5474 entitled "SEAT APPARATUS PIVOTABLE TO CHANGE DIRECTION IN WHICH PERSON SITTING THEREON FACES".

FIG. 13A and FIG. 13B hereof are side elevational views of a seat apparatus 100 disclosed in the publication.

As shown in FIG. 13A, the seat apparatus 100 is held in a forward-facing position where a person sits thereon facing forwardly. The seat apparatus 100 includes a base 101, a seat cushion portion 105, and a seat back portion 106. The seat cushion portion 105 is laid while the seat back portion 106 is erected. The base 101 has a link arm 103 pivotally attached thereto. The link arm 103 is pivotable on a pivotal shaft 102 between a laid position and an erected position. The link arm 103 has its end portion mounted to the seat cushion portion 105. The seat cushion portion 105 is pivotable on a pivot shaft 104 between a laid position and an erected position. The seat back portion 106 is attached to the base 101 in such a manner as to pivot on the pivotal shaft 102 between a laid position and an erected position. The seat back portion 106 has a headrest 107 detachably mounted thereto.

When the seat back portion 106 is backwardly pivoted to the laid position and the headrest 107 is detached from the seat back portion 106, the seat apparatus 100 can be brought to a lying position. In this position, both the seat cushion portion 105 and the seat back portion 106 are substantially horizontally disposed.

Then, the link arm 103 is upwardly pivoted to thereby bring the seat cushion 105 to the erected position with the seat back portion 106 held in the laid position. The seat apparatus 100 can thus be in a rear-facing position, so that a person sits thereon facing rearwardly.

The seat apparatus 100 as shown in FIG. 13A can also be brought to an upright position in which the seat cushion portion 105 and the seat back portion 106 are in the erected positions. This can be done by turning the seat cushion portion 105 to the erected position with the seat back portion 106 held in the erected position. As can be seen from the foregoing, the seat apparatus 100 can be brought to any one of the aforementioned four positions: (1) the forward-facing position, (2) the lying position, (3) the rear-facing position, and (4) the upright position.

For known vehicle including such a seat apparatus, a back seat is typically provided. The back seat is positioned behind the seat apparatus. If the seat back portion 106 is designed to pivot forwardly to a horizontal position, a person sitting on the back seat will be able to use the thus horizontally disposed seat back portion 106 as a table.

For the seat apparatus 100, however, a front lower part of the seat back portion 106 inevitably abuts on a rear upper part of the seat cushion portion 105, as shown in FIG. 13B, when the seat back portion 106 is forwardly turned or pivoted on the shaft 102. With the front lower part abutted on the rear upper part, the seat back portion 106 can not pivot further forwardly. Consequently, the seat back portion 106 thus arranged can not serve as a table.

SUMMARY OF THE INVENTION

An object of the present invention is to provide a seat including a seat cushion pivotable between a laid position and an erected position, and a seat back pivotable between a laid position and an erected position, such that the seat not only can be in any one of a forward-facing position, a lying position, a rear-facing position, and an upright position, but it can also be held in a folded position where the seat back lies on the seat cushion for use as a table.

According to an aspect of the present invention, there is provided a seat comprising: a seat supporting carrier; a seat cushion mounted on the seat supporting carrier in such a manner as to pivot on a first pivot axis between an erected position and a laid position; a swing arm mounted on the seat supporting carrier in such a manner as to pivot on a second pivot axis between an erected position and a laid position; and a seat back mounted on the swing arm in such a manner as to pivot on a third pivot axis between an erected position and a laid position.

In a preferred form of the present invention, the second pivot axis is positioned higher than the first pivot axis.

Preferably, the third pivot axis is positioned higher than the first pivot axis and the second pivot axis when the seat back is in the erected position and the seat cushion is in the laid position.

In a further preferred form of the present invention, the seat back, by pivoting from the erected position to the laid position, lies on the seat cushion.

The third pivot axis is positioned higher than the first pivot axis and the second pivot axis when the seat back is in the erected position and the seat cushion is in the laid position. This arrangement allows the seat back to pivot forwardly to the laid position. In this position, the seat back lies on the seat cushion. This arrangement has the advantage that a back surface portion of the lain seat back serves as a table on which cups, books, luggage and the like can be placed. If another seat (back seat) is provided behind the seat of the present invention, a person to sit on the former will use the back surface portion as a table. It will be appreciated that the seat of the present invention can be in any one of a forward-facing position, a lying position, a rear-facing position, and an upright position, as is conventional.

In a still further preferred form of the present invention, the first pivot axis and the second pivot axis are disposed in substantially vertical alignment when viewed in side elevation.

The seat extends in a front-and-rear direction thereof to a smaller extent than it would do if the first pivot axis were not vertically aligned with the second pivot axis.

In a yet further preferred form of the present invention, the seat back has a back surface portion on which a substantially flat sheet member is provided.

Because the seat back is in the laid position, the sheet member is horizontally disposed. The sheet member thus horizontally disposed serves as a table. The back surface portion provided with the sheet member has an increased rigidity. The sheet member supports cushion material of the seat back. The seat back thus arranged functions as a backrest. The sheet member for use as a table is sufficiently rigid to be loaded with luggage.

In a still further preferred form of the present invention, each of the seat back and the seat cushion has mounting portions formed therein, the mounting portions having headrests detachably mounted thereto.

An user can attach the headrests to either one or both of the seat cushion and the seat back in correspondence to the position of the seat.

BRIEF DESCRIPTION OF THE DRAWINGS

A certain preferred embodiment of the present invention will hereinafter be described in detail, by way of example only, with reference to the accompanying drawings, in which:

FIGS. 4A through 4C show how the seat back lock mechanism is operated to lock the seat back;

FIG. 5A is a side elevation view of the seat back while FIG. 5B is a rear elevation view of the seat back;

FIGS. 7A through 7D show various manners in which headrests are attached to the seat;

FIG. 8A is a perspective view showing the seat in a forward-facing position while

DETAILED DESCRIPTION OF THE PREFERRED EMBODIMENT

The following description is merely exemplary in nature and is in no way intended to limit the invention or its application or uses.

Figure 1:
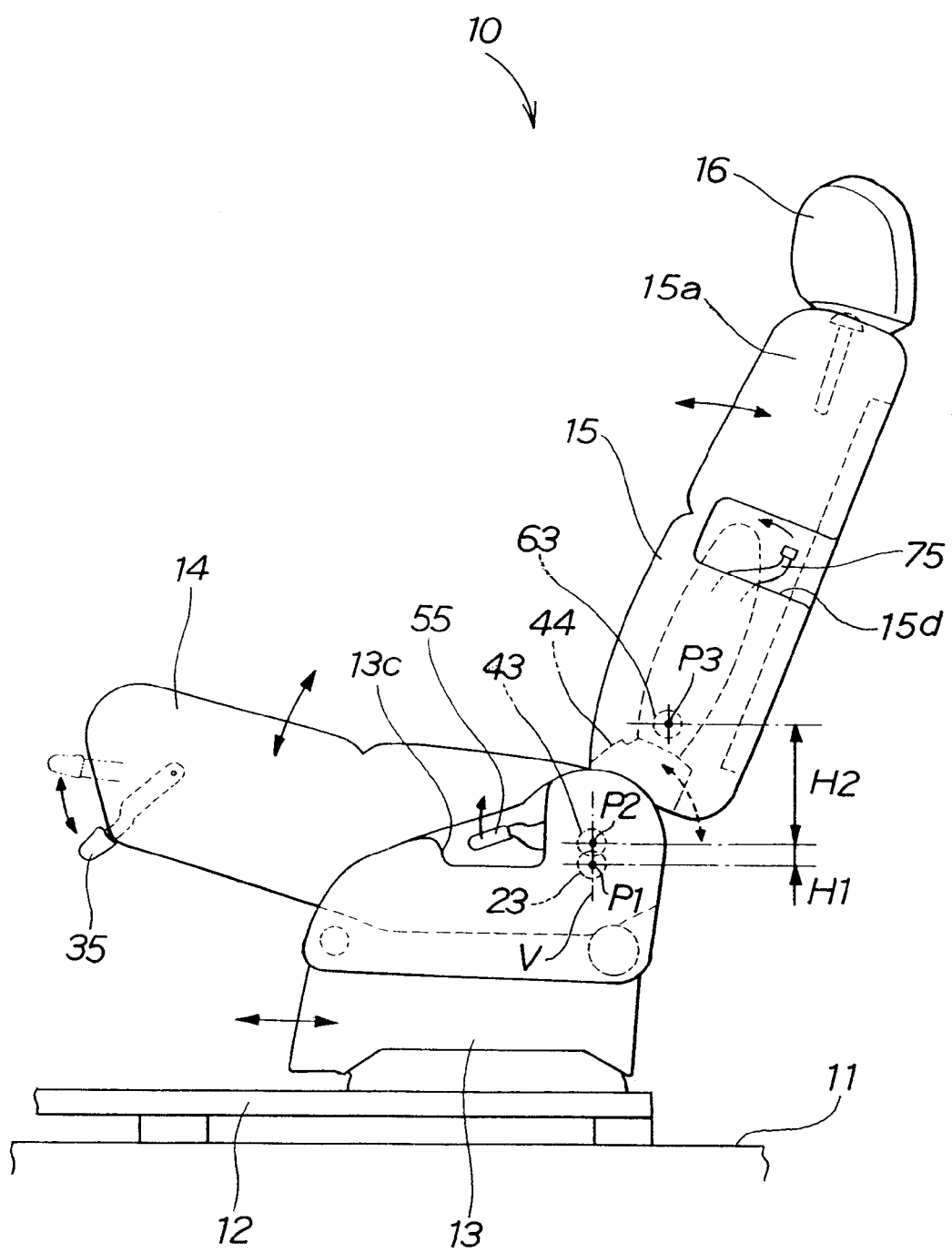
FIG. 1 is a left side elevation view of a seat according to the present invention.

As shown in FIG. 1, a seat 10 is carried on slide rails 12, 12 mounted on a floor 11 of such a vehicle as a van, a bus, and a train. More specifically, the seat 10 includes a seat supporting carrier 13 slidably mounted on the slide rails 12, 12 extending in a front-and-rear direction of the seat 10. The carrier 13 has a seat cushion 14 pivotally mounted thereon. The carrier 13 also has a left swing arm 44 pivotally attached thereto. A seat back 15 is pivotally mounted on the swing arm 44. The seat back 15 has its upper end portion 15a to which a headrest 16 is detachably mounted.

Figure 2:
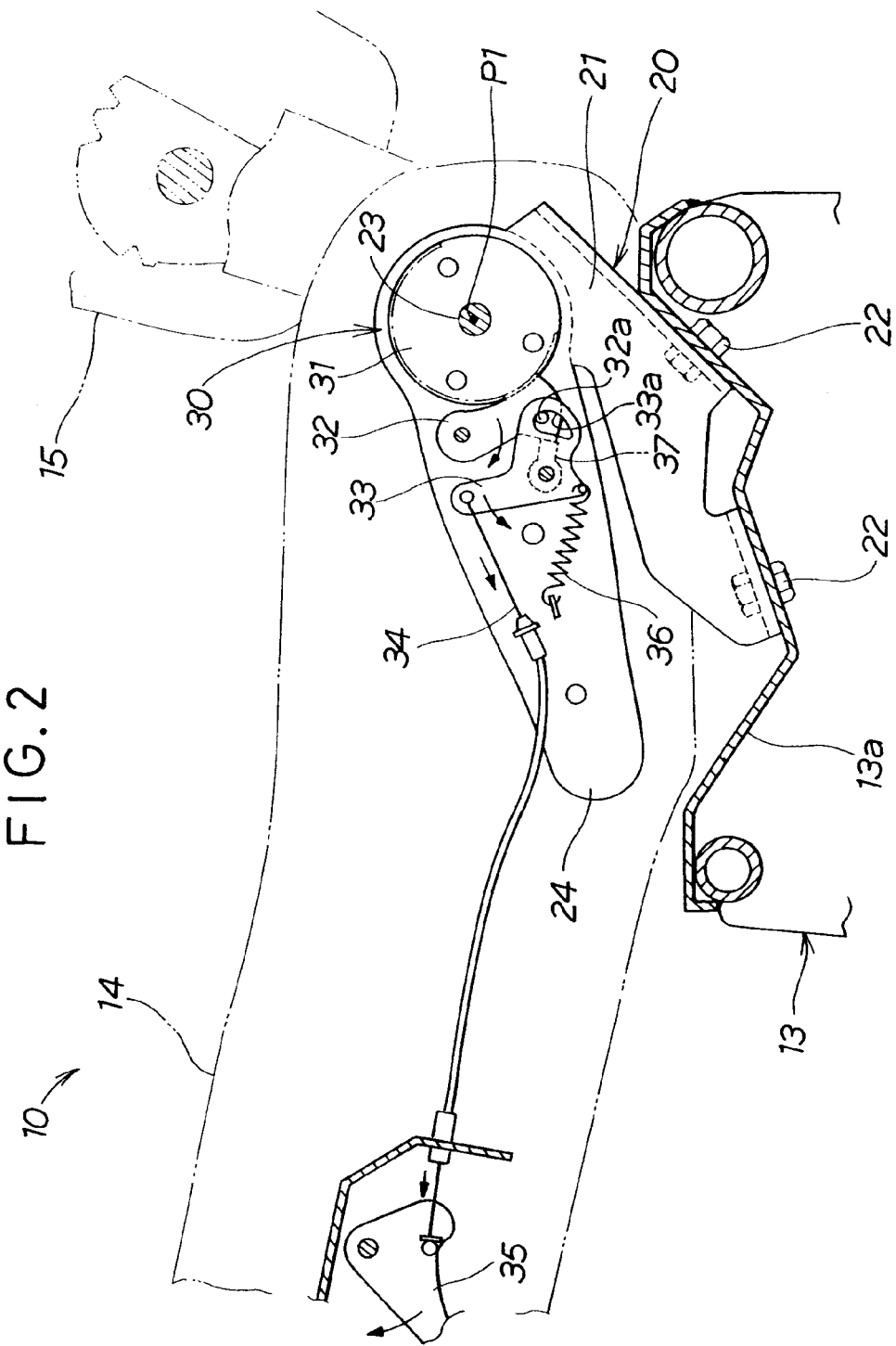
FIG. 2 is a left side elevation view of a cushion lock mechanism for locking a seat cushion.

Referring to FIG. 2, the carrier 13 has a left first mounting part 13a provided at an upper end portion thereof. The first mounting part 13a has a left first hinge 20 attached thereto. More specifically, the hinge 20 includes a fixed arm 21 attached to the mounting part 13a by means of bolts 22, 22. The hinge 20 further includes a movable arm 24. The movable arm 24 is pivotally mounted to the fixed arm 21 through a first support shaft 23. The arm 24 extends substantially forwardly from the shaft 23. The arm 24 is attached to a rear end portion (shown by a phantom line) of the seat cushion 14 via a screw or the like. The seat cushion 14 is pivotable on a central axis of the shaft 23 between a laid position and an erected position. The central axis of the first support shaft 23 is hereinafter referred to as "first pivot axis P1".

The hinge 20 includes a cushion lock mechanism 30 for locking the seat cushion 14. The cushion lock mechanism 30 includes a sector gear 31 mounted to the arm 21. The pivot axis P1 is positioned centrally of the sector gear 31. The cushion lock mechanism 30 also includes a locking gear 32 pivotally attached to the arm 24. More specifically, the locking gear 32 is disposed to pivot into and out of meshing engagement with the sector gear 31, as will be discussed later. The cushion lock mechanism 30 has a cam member 33 pivotally mounted to the arm 24. The cam member 33 is disposed to pivot in such a manner as to bring the locking gear 32 out of the meshing engagement with the sector gear 31, as will be described below. The cam member 33 has a first operational lever 35 connected thereto via a wire cable 34. When the lever 35 is operated, the cam member 33 is caused to pivot in the manner as stated later. The cushion lock mechanism 30 further includes a return spring 36 for the cam member 33. The spring 36 urges the cam member 33 in such a manner that the locking gear 32 maintains the meshing engagement with the sector gear 31. The spring 36 is, for example, a coil spring. The cam member 33 has a lock cam 37 mounted thereon. More specifically, the lock cam 37 is disposed to help maintain the sector gear 31 and the locking gear 32 in meshing engagement.

The locking gear 32 includes a pin 32a extending perpendicularly to this sheet. The cam member 33 includes a cam aperture 33a into which the pin 32a extends. The lever 35 is mounted at a front part of the seat cushion 14. The lock cam 37 supports a back surface of the locking gear 32 so as to help maintain the meshing engagement between the locking gear 32 and the sector gear 31.

In FIG. 2, the seat cushion 14 is shown as being locked by the cushion lock mechanism 30. With the seat cushion 14 held in a locked position, the lock cam 37 supports the back surface of the locking gear 32 while the locking gear 32 meshes with the sector gear 31. This arrangement prevents the seat cushion 14 from pivoting on the first pivot axis P1.

When an user turns the lever 35 upwardly by hand, as shown in an arrow, the wire cable 34 is pulled to cause the cam member 33 to pivot counterclockwise, as indicated by an arrow. This counterclockwise pivotal movement of the cam member 33 causes the lock cam 37 to move away from the back surface of the locking gear 32. As the cam member 33 is pivoted counterclockwise, the pin 32a is caused to pivot clockwise by a peripheral edge forming the contour of the cam aperture 33a formed in the cam member 33, as shown by an arrow. Therefore, the locking gear 32 is pivoted clockwise, as shown by an arrow, to thereby disengage from the sector gear 31. With the locking gear 32 disengaged from the sector gear 31, the seat cushion 14 is free to turn or pivot so that it can be erected or otherwise inclined at a desired angle. It should be noted that 5 the user holds the lever 35 in the upwardly turned position to maintain the disengagement of the locking gear 32 from the sector gear 31.

When the user takes her or his hand off the lever 35 with the seat cushion 14 erected or inclined at the desired angle, the return spring 36 makes the cam member 33 pivot clockwise or back to its original position to thereby turn the lever 35 back to its original position. At the same time, the lock cam 37 attached to the cam member 33 is also brought back to its original position. This causes the locking gear 32 to pivot counterclockwise into the meshing engagement with the sector gear 31. Because the locking gear 32 is in the meshing engagement with the sector gear 31, the seat cushion can be held in the erected position, or otherwise in the inclined position.

The seat supporting carrier 13 also has a right first hinge provided rightwardly thereof. The right first hinge has a cushion lock mechanism. The cushion lock mechanisms of the right and left hinges are arranged to be operated together by the first operational lever 35. The right first hinge is identical in construction to the previously described left one, and hence its description will be omitted.

Figure 3:
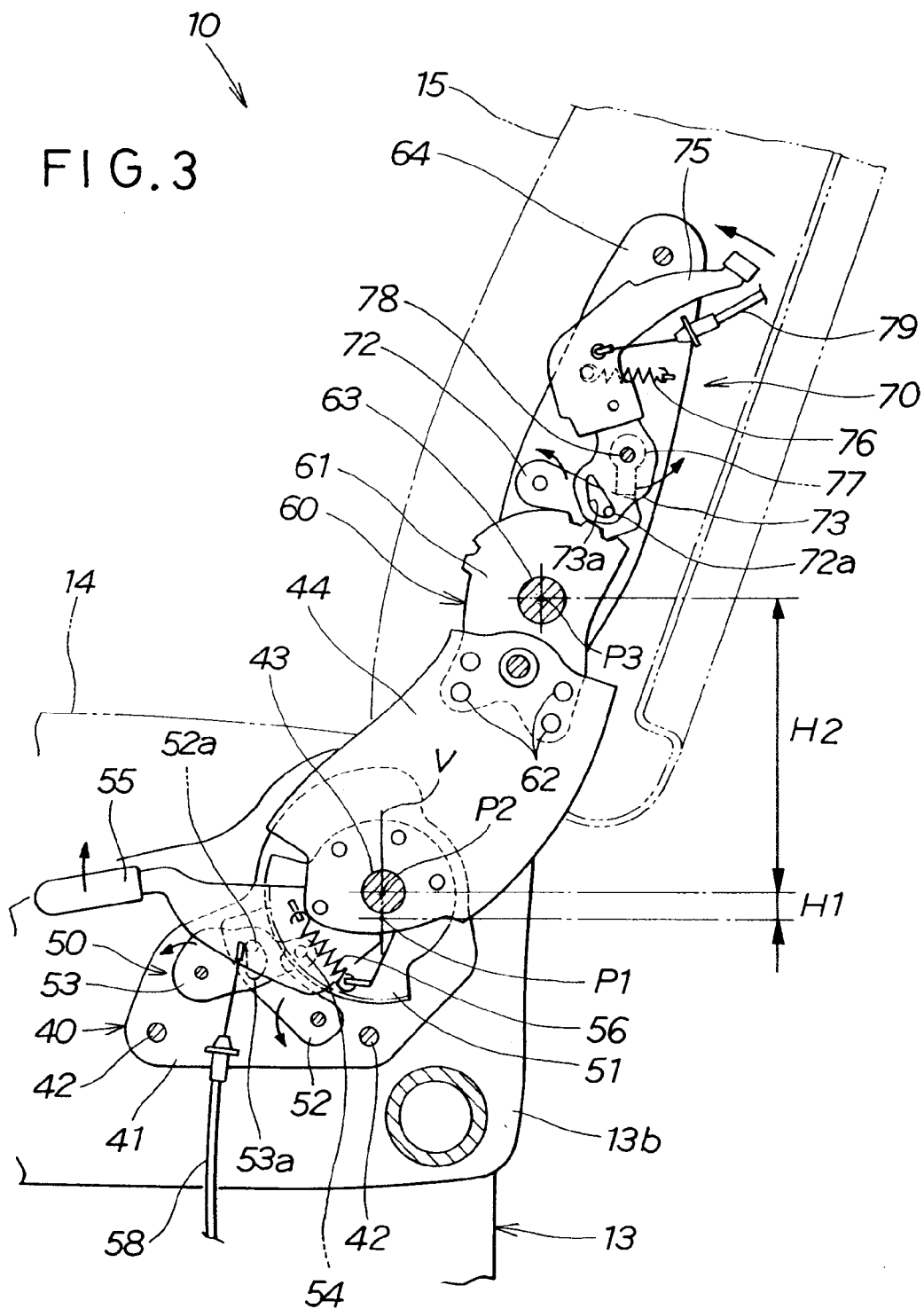
FIG. 3 is a left side elevation view of an arm lock mechanism for locking a swing arm, and a seat back lock mechanism for locking a seat back.

Turning to FIG. 3, the carrier 13 includes a left second mounting part 13b provided at the side of an upper part thereof. The second mounting part 13b has a fixed arm 41 of a left second hinge 40 firmly attached thereto by means of bolts 42, 42. The second hinge 40 includes a swing arm 44 mounted to the fixed arm 41 through a second support shaft 43. The swing arm 44 is pivotable on a central axis of the second support shaft 43 between a laid position and an erected position. The swing arm 44 extends substantially upwardly from the support shaft 43. The central axis of the second support shaft 43 is hereinafter referred to as "second pivot axis P2".

The second hinge 40 includes an arm lock mechanism 50 for locking the swing arm 44. The arm lock mechanism 50 has a sector gear 51 attached to the swing arm 44. The sector gear 51 has the second pivot axis P2 positioned centrally thereof. The arm lock mechanism 50 includes a locking gear 52 mounted to the fixed arm 41 in such a manner as to pivot into and out of meshing engagement with the sector gear 51, as will be discussed later. The arm lock mechanism 50 further includes a cam member 53 pivotally attached to the arm 41 in such a manner as to bring the gear 52 out of the meshing engagement with the gear 51, as will be stated later. The arm lock mechanism 50 has a second operational lever 55 connected to the cam member 53 via a pin 54. The lever 55 is disposed to cause the cam member 53 to pivot in the manner as described later. The arm lock mechanism 50 also has a return spring 56 for the lever 55. The spring 56 urges the lever 55 in such a manner that the locking gear 52 maintains meshing engagement with the gear 51. The spring can be, for example, a coil spring. A lock cam (not shown) is attached to the cam member 53 so as to help maintain the meshing engagement between the gear 52 and the gear 51.

The gear 52 has a pin 52a extending therefrom in a direction perpendicular to this sheet. The cam member 53 has a cam aperture 53a formed therein. The pin 52a extends into the cam aperture 53a. The lever 55 is pivotable on the second pivot axis P2. The lock cam supports a back surface of the gear 52 to help maintain the locking gear 52 in the meshing engagement with the sector gear 51. The lock cam serves the same function as the lock cam 37 shown in FIG. 2.

In FIG. 3, the swing arm 44 is shown as being locked by the arm lock mechanism 50. With the swing arm 44 locked, the locking gear 52 has its back surface supported by the lock cam, as discussed above. The gear 52 meshes with the gear 51. This arrangement prevents the pivotal movement of the swing arm 44.

When the user turns the second operational lever 55 upwardly by hand, the cam member 53 is pivoted counterclockwise, as shown by an arrow. This pivotal movement of the cam member 53 moves the lock cam away from the back surface of the gear 52. As the cam member 53 is pivoted, the pin 52a is caused to pivot counterclockwise by a peripheral edge forming the contour of the aperture 53a formed in the cam member 53. This causes the locking gear 52 to pivot counterclockwise and then disengage from the sector gear 51. With the gear 52 disengaged from the gear 51, the swing arm 44 is free to turn or pivot so that it can be laid or otherwise inclined at a desired angle. It should be noted that the user holds the lever 55 in the upwardly turned position to maintain the disengagement of the gear 52 from the gear 51.

When the user takes her or his hand off the lever 55 with the swing arm 44 laid or inclined at the desired angle, the lever 55 is turned back to its original position by the spring 56 to thereby turn the cam member 53 and the lock cam back to their original positions. The gear 52 is then pivoted clockwise into the meshing engagement with the gear 51. Since the locking gear 52 meshes with the sector gear 51, it is therefore to hold the swing arm 44 in the laid position or otherwise in the inclined position.

The carrier 13 also has a right second hinge provided rightwardly thereof. The right second hinge has an arm lock mechanism. The arm lock mechanism of the right second hinge has a cam member connected to the second operational lever 55 via a wire cable 58, such that, when the lever 55 is turned, the arm lock mechanisms of the right and left second hinges are operated together. The arm lock mechanism of the right second hinge has the same arrangement as that of the left second hinge 20, and therefore its description will be omitted.

The seat 10 has a left third hinge 60 provided leftwardly thereof. The hinge 60 includes a sector gear 61 attached via plural rivets 62 to an end portion of the swing arm 44. The sector gear 61 serves as a fixed arm. The hinge 60 further includes a movable arm 64 pivotally mounted through a third support shaft 63 to the sector gear 61. The arm 64 extends substantially upwardly from the shaft 63. The arm 64 is attached through screws and the like to a rear end portion of the seat back 15 shown by a phantom line. The seat back 15 is arranged to pivot on a central axis of the shaft 63. The central axis of the third support shaft 63 is hereinafter referred to as "third pivot axis P3".

The third hinge 60 includes a seat back lock mechanism 70 for holding the seat back 15 in either of a laid position and an erected position. The mechanism 70 includes a locking gear 72 pivotally mounted to the movable arm 64. More specifically, the gear 72 is disposed to pivot into and out of the meshing engagement with the sector gear 61, as will be discussed later. The mechanism 70 further includes a cam member 73 pivotally attached to the movable arm 64. The cam member 73 is disposed to pivot in such a manner as to bring the gear 72 out of the meshing engagement with the gear 61, as described later. The cam member 73 is mounted to a third operational lever 75. The lever 75 is arranged to cause the cam member 73 to pivot in the manner as discussed later. The mechanism 70 includes a return spring 76 for the cam member. The spring 76 urges the lever 75 in such a manner that the locking gear 72 maintains meshing engagement with the sector gear 61. The spring 76 can be, for example, a coil spring. The mechanism 70 also includes a lock cam 77 attached to the cam member 73. The lock cam 77 supports a back surface of the locking gear 72 to help maintain the meshing engagement between the gear 72 and the gear 61.

The locking gear 72 includes a pin 72a extending perpendicularly to this sheet. The cam member 73 has a cam aperture 73a formed therein. The pin 72a extends into the aperture 73a.

Reference is made to FIG. 4A. The seat back 15 is in a neutral position I, i.e., a locked position. In this position, the locking gear 72 meshes with the sector gear 61 while the locking gear 72 has its back surface supported by the lock cam 77. This arrangement prevents the seat back 15 from pivoting.

When the user turns the lever 75 forwardly from the neutral position I, as indicated by an arrow, the cam member 73 counterclockwise pivots on a support shaft 78. This counterclockwise pivotal movement of the cam member 73 causes the lock cam 77 to pivot counterclockwise away from the back surface of the locking gear 72, as shown in FIG. 4B. At this time, the lever 75 is in a second position II.

When the user turns the lever 75 forwardly from the second position II, as shown by an arrow, the cam member 73 further counterclockwise pivots on the shaft 78. The pin 72a is then caused to pivot counterclockwise by a peripheral edge forming the outline of the aperture 73a formed in the cam member 73, as shown in FIG. 4C. The locking gear 72 is thus caused to pivot counterclockwise. Therefore, the gear 72 disengages from the sector gear 61. At this time, the gear 72 is in a third position III. With the gear 72 in the third position, the seat back 15 is free to turn or pivot so that the user can bring the seat back 15 to the laid position.

When the user takes her or his hand off the lever 75 with the seat back 15 laid, the lever 75 is turned back to the neutral position I by the spring 76 to thereby turn the cam member 73 and the lock cam 77 back to their original positions. The locking gear 72 is then pivoted clockwise into the meshing engagement with the sector gear 61. Accordingly, it becomes possible to hold the seat back 15 in the laid position.

The seat 10 has a right third hinge provided rightwardly thereof. The right third hinge includes a right seat back lock mechanism. The right seat back lock mechanism is provided to a swing arm of the right second hinge. The right seat back lock mechanism has a cam member connected to the third operational lever 75 by means of a wire cable 79, such that, when the lever 75 is turned, the right and left seat back lock mechanisms are operated together. The right seat back lock mechanism is identical in construction to the left one, and hence its description will be omitted.

Reference is made back to FIG. 1. When the seat back 15 is in the erected position and the seat cushion 14 is in the laid position, the third pivot axis P3 is positioned higher than the first and second pivot axes P1, P2. More specifically, the second pivot axis P2 is spaced from the first pivot axis P1 by a distance Hi while the third pivot axis P3 is spaced from the second pivot axis P2 by a distance H2.

The distances H1, H2 are set such that the seat back 15, by pivoting forwardly from the erected position to the laid position, lies on the seat cushion 14 in t he laid position. A level at which the third pivot axis P3 is positioned depends upon the length of the swing arm 44.

The first pivot axis P1 and the second pivot axis P2 are disposed in vertical alignment, as viewed in side elevation. More specifically, when viewed in side elevation, the first and second pivot axes P1, P2 are positioned such that a vertical line V extends therethrough. The distance by which the seat 10 extends in the front-and-rear direction is smaller when the 10 axes P1, P2 are vertically aligned than when they are not vertically aligned.

If the axis P1 is positioned in front of the axis P2, or at the front part or central part of the seat cushion 14, the seat cushion 14, when in the erected position, will be smaller in height.

In the illustrated embodiment, the axis P1 is substantially vertically aligned with the axis P2. Therefore, the seat cushion 14, when erected, is larger in height. As will be described later, the seat 10 can be brought to a rear-facing position in which the seat cushion 14 is in the erected position while the seat back 15 is in a horizontal position. The seat cushion 14, when in the erected position, is high enough to serve as a "backrest".

As shown in FIG. 1, the first operational lever 35 is mounted at the front part of the seat cushion 14. The second operational lever 55 is received in a recessed portion 13c formed in a left side part of the carrier 13. The third operational lever 75 is received in a recessed portion 15d formed in a left side part of the seat back 15.

Figures 5A, 5B:
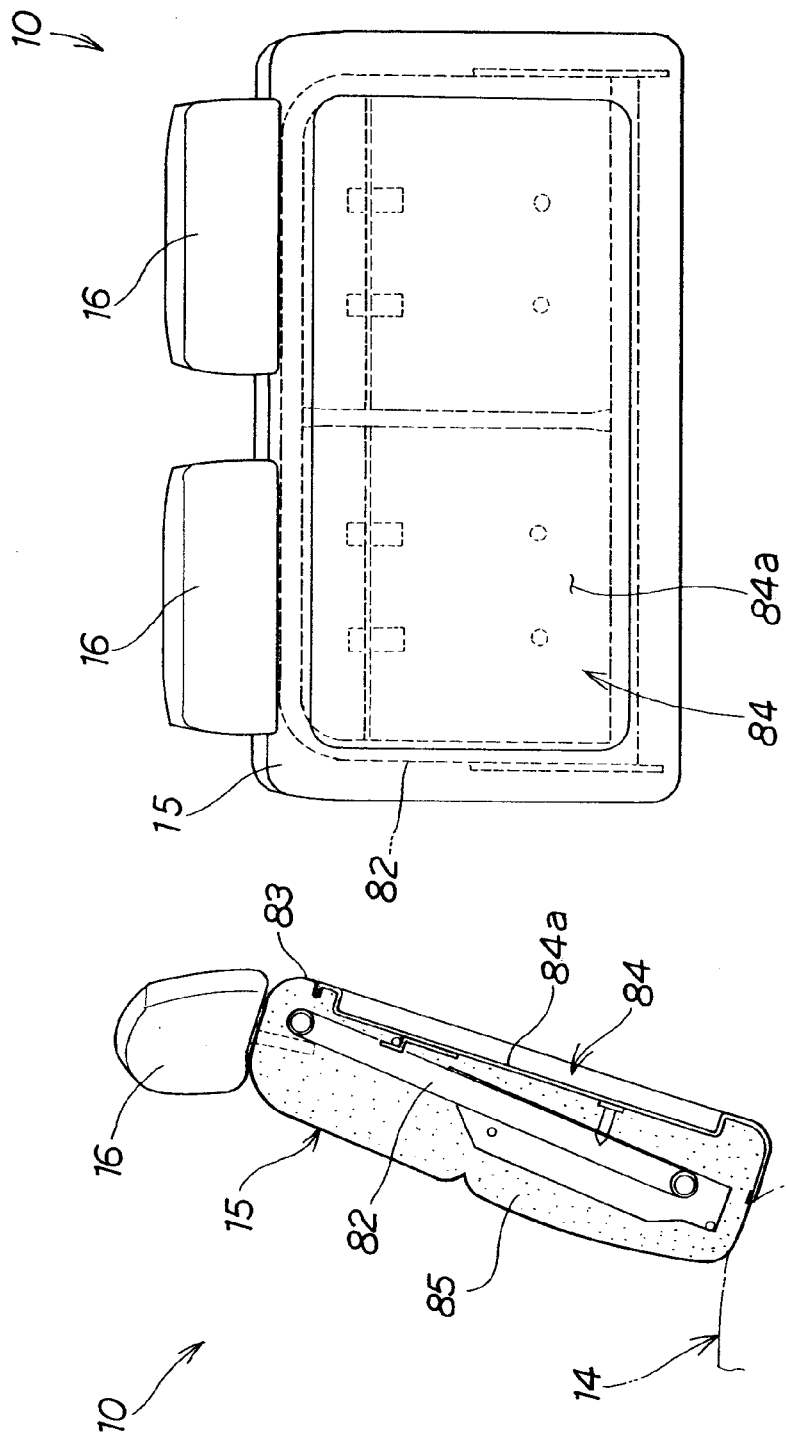

Turning to FIG. 5A and FIG. 5B, the seat back 15 has its back surface portion 83 on which a generally flat sheet member 84 is provided. The sheet member 84 is attached to a frame 82 for the seat back 15. The frame 82 takes the form of a horizontally oriented rectangle, when viewed in rear elevation. The sheet member 84 has a recessed part formed centrally thereof. The recessed part of the sheet member 84 has its flat bottom. The flat bottom serves as a table surface 84a.

The sheet member 84 provided on the back surface portion 83 is sufficiently rigid to support a cushion material 85 of the seat back 15. The seat back 15 thus arranged functions as a backrest.

When the seat back 15 is pivoted to the laid position to thereby lay the back surface portion 83, the table surface 84a of the sheet member 84 provided on the thus horizontally disposed back surface portion 83 can also be horizontally arranged for use as a table. The table surface 84a provides strength sufficient to be loaded with luggage.

Figure 6:
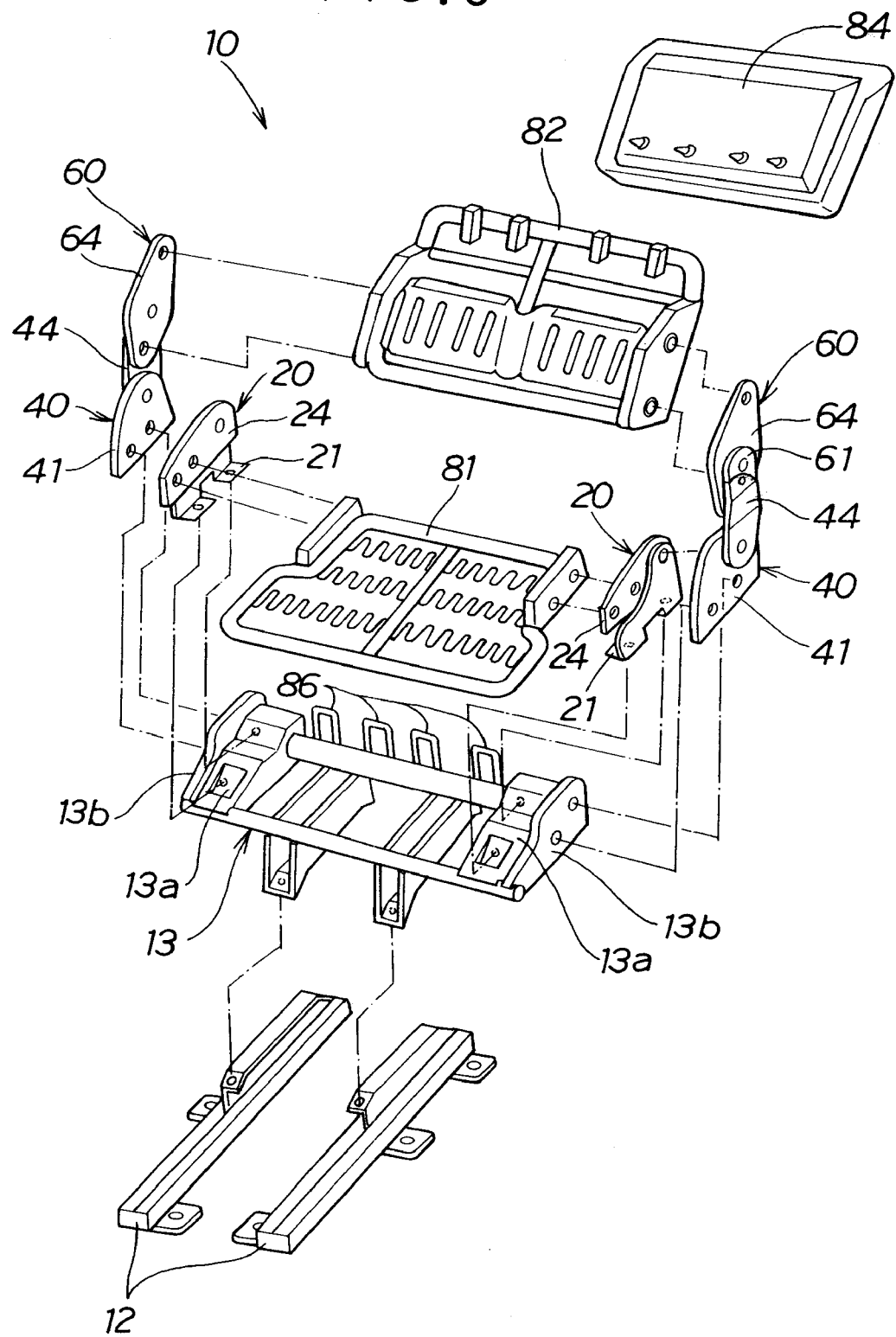
FIG. 6 is an exploded perspective view of the seat.

Reference is made to FIG. 6. The seat supporting carrier 13 is to be mounted to the right and left slide rails 12, 12. The right and left first hinges 20, 20 are to be attached to the right and left mounting parts 13a, 13a of the carrier 13. A frame 81 for the seat cushion is to be mounted to the movable arms 24, 24 of the hinges 20, 20. The right and left second hinges 40, 40 are to be attached to the right and left mounting parts 13b, 13b of the carrier 13. The right and left third hinges 60, 60 are to be mounted to the swing arms 441 44 of the hinges 40, 40. The frame 82 is to be attached to the movable arms 64, 64 of the hinges 60, 60. The sheet member 84 is to be mounted to the frame 82.

The left mounting part 13a is formed integrally with the left mounting part 13b while the right mounting part 13a is formed integrally with the right mounting part 13b. The left mounting parts 13a, 13b are mounted to a left end of the carrier 13 whilst the right mounting parts 13a, 13b are mounted to a right end of the carrier 13. This arrangement is advantageous in that the carrier 13 increases in rigidity.

Provided to a rear portion of the carrier 13 are plural anchoring members 86 to which child seats (not shown) can be attached. Although the anchoring members 86 are shown as being provided to the carrier 13, they may be provided to the frame 81 for the seat cushion, or the frame 82 for the seat back.

Referring to FIG. 7A through FIG. 7D, the seat cushion 14 has two mounting portions 14c, 14c formed in a front end portion 14a thereof. The seat cushion 14 also has three mounting portions 14c, 14c, 14c formed in an upper surface portion 14b thereof. The headrests 16 can be detachably attached to any mounting portions formed in the seat cushion 14. The seat back 15 has two mounting portions 15c, 15c formed in an upper end portion 15a thereof. The seat back 15 also has three mounting portions 15c, 15c, 15c formed in a front surface portion 15b thereof. The headrests 16 can be detachably mounted to any mounting portions formed in the seat back 15.

As shown in FIG. 7B, the two headrests 16, 16 are detached from the mounting portions 15c, 15c formed in the upper end portion 15a. Then, one of the headrests 16, 16 is attached to the mounting portion 15c formed in the middle of the front surface portion 15b. The other is attached to the mounting portion 14c formed in the middle of the upper surface portion 14b.

Alternatively, as shown in FIG. 7C, one of the headrests 16, 16 can be attached to the mounting portion 15c formed in a right end of the front surface portion 15b. The other can be attached to the mounting portion 14c formed in a right end of the upper surface portion 14b.

As shown in FIG. 7D, when the seat 10 is in the rear-facing position, the headrests 16, 16 are detached from the mounting portions 15c, 15c formed in the upper end portion 15a, whereafter they are attached to the mounting portions 14c, 14c formed in the front end portion 14a.

As thus far explained, the seat back 15 is provided with the mounting portions to which the headrests 16, 16 can be detachably attached. Similarly, the seat cushion 14 is provided with the mounting portions to which the headrests 16, 16 can be detachably attached. Thus, the headrests 16, 16 can be attached to the seat cushion 14, the seat back 15, or both in correspondence to the positions of the seat cushion 14 and the seat back 15.

Figure 8A:
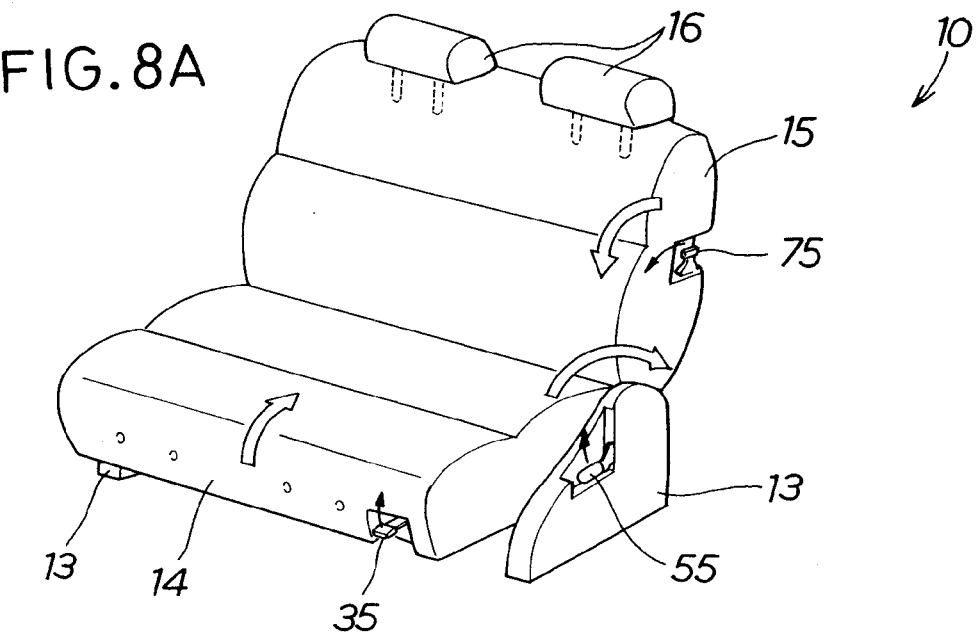
Figure 8B:
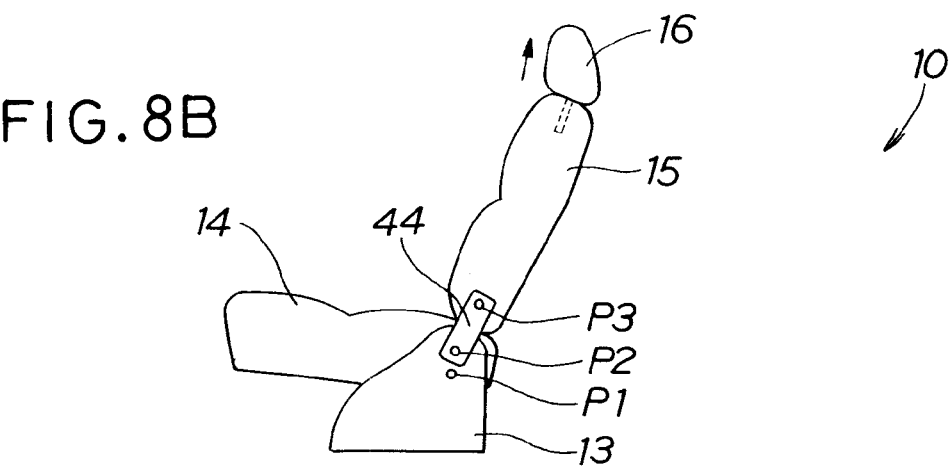
FIG. 8B is a side elevation view of the seat of FIG. 8A.

As shown in FIGS. 8A and 8B, the seat 10 is in a forward-facing position in which a person can sit thereon facing forwardly. The headrests 16, 16 are attached to the mounting portions 15c, 15c formed in the upper end portion 15a. The seat cushion 14 is in the laid position. The swing arm 44 is in the erected position. The seat back 15 is in the erected position.

Figure 9:
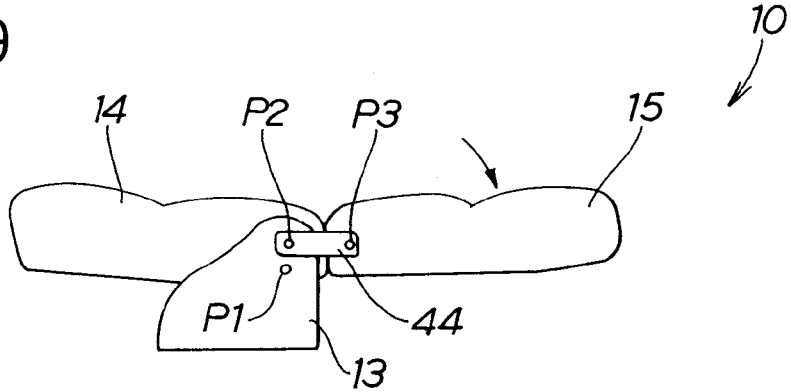
FIG. 9 is a side elevation view of the seat in a lying position.

When the second operational lever 55 is turned upwardly, the swing arm 44 is pivoted to the laid position to thereby bring the seat back 15 to the horizontal position. Thereafter, the headrests 16, 16 are detached from the mounting portions 15c, 15c. Accordingly, the view of FIG. 9 is attained where the seat 10 can be in a lying position. In this position, the seat cushion 14 and the seat back 15 are substantially horizontally disposed. The thus arranged seat 10 can be used as a bed.

Figure 10:
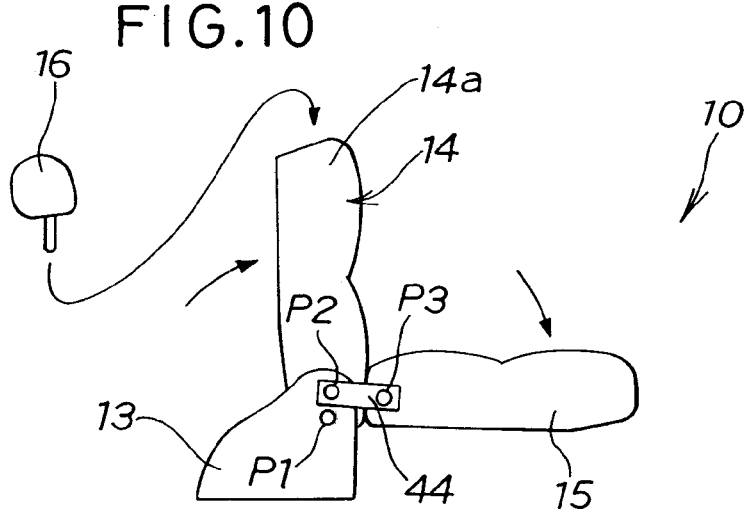
FIG. 10 is a side elevation view of the seat in a rear-facing position.

The seat 10 can also be brought to the rear-facing position, as shown in FIG. 10. More specifically, after the seat back 15 is brought to the horizontal position in the manner as described with respect to FIG. 9, the first operational lever 35 is turned upwardly to cause the seat cushion 14 to pivot to the erected position. The user can sit on the thus arranged seat 10 facing rearwardly. At the option of the user, the headrests 16, 16 may be attached to the mounting portions 14c, 14c of the front end portion 14a.

Figure 11:
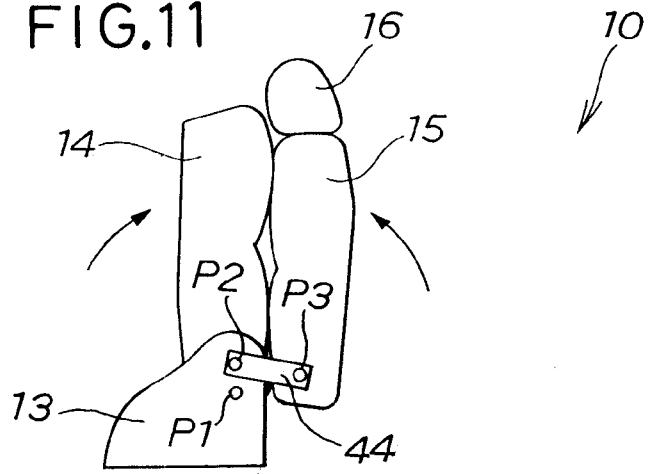
FIG. 11 is a side elevation view of the seat in an upright position.

Further, the seat 10 can be brought to an upright position, as shown in FIG. 11. More specifically, after the seat 10 is brought to the rear-facing position in the manner as stated in relation to FIG. 10, the third operational lever 75 is turned in the manner as explained with reference to FIG. 4A through FIG. 4C, such that the seat back 15 is pivoted to the erected position as shown in FIG. 11. Because the seat cushion 14 is in the erected position, a space is formed in front of the seat cushion 14. Likewise, a space is formed behind the seat back 15 since the seat back 15 is in the erected position. Such spaces are suitable for placement of luggage.

The seat back 15 is disposed to pivot on the third pivot axis P3 as previously described. It is therefore unlikely for a the erected seat cushion 14 to hinder the seat back 15 from pivoting from the horizontal position to the erected position. In other words, the erected seat cushion 14 does not interfere with the pivotal movement of the seat back 15.

Figure 12:
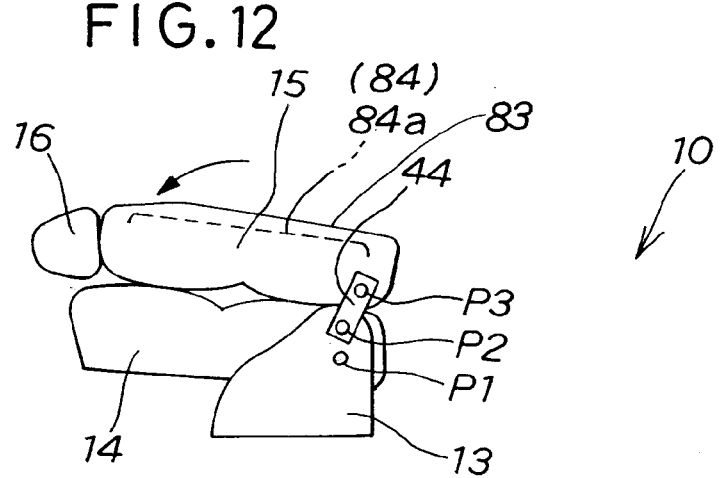
FIG. 12 is a side elevation view of the seat in a folded position.
Figure 13A:
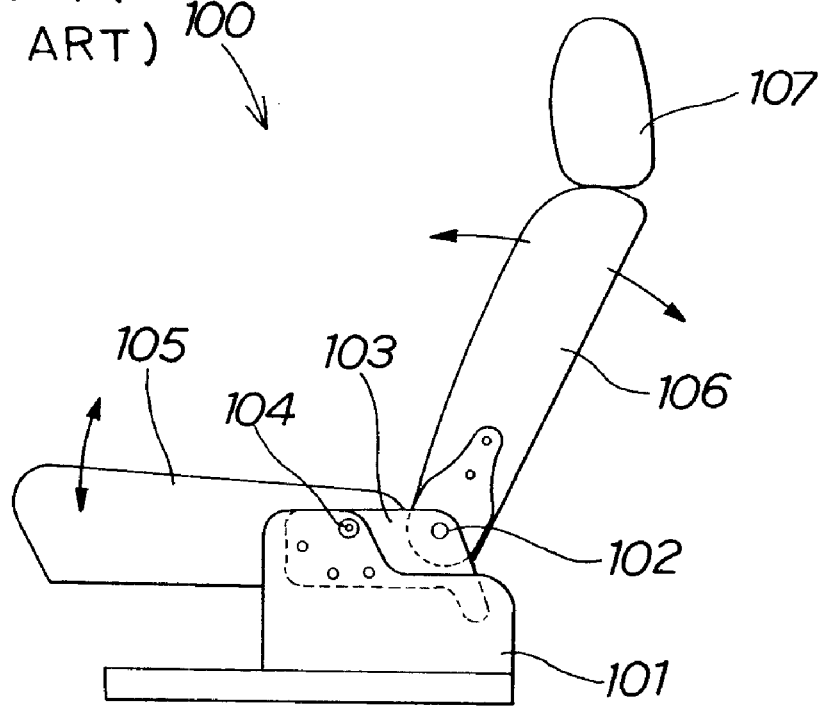
FIGS. 13A and 13B show, in side elevation, a conventional seat pivotable between a forward-facing position and a rear-facing position.
Figure 13B:
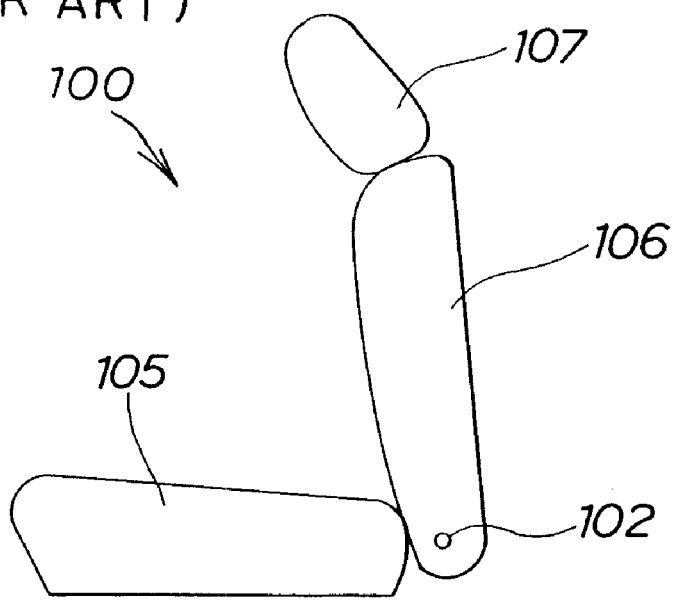

Furthermore, the seat 10 can be brought from the forward-facing position to a folded position, as shown in FIG. 12. More specifically, the seat back 15, by pivoting forwardly from the erected position (see FIGS. 8A and 8B) to the laid position, lies on the seat cushion 14 held in the laid position. Because the third pivots axis P3 is positioned higher than the first and second pivot axes P1, P2, the laid seat cushion 14 does not hinder the seat back 15 from pivoting from the erected position to the laid position.

When the seat 10 is in the folded position in which the seat back 15 is in the laid position, as shown in FIG. 12, the back surface portion 83 is substantially horizontally disposed. This arrangement is advantageous because the table surface 84a of the sheet member 84 provided on the back surface portion 83 can be used as a table on which cups, books, luggage and the like can be put or placed. If another seat is provided behind the seat 10, a person sitting on the former can use the table surface 84a as a table.

From the foregoing description, the seat 10 can be held in any one of the forward-facing position, the lying position, the rear-facing position, the upright position, and the folded position. When the seat 10 is in the folded position, the sheet member 84 can be used as a table.

It will be noted that the seat 10 can be carried on other than the vehicle.

The back surface portion 83 has been described as being provided with the sheet member 84. However, the back surface portion 83 may be arranged in a variety of other manners within the principles of the invention to serve as a table.

Obviously, various minor changes and modifications of the present invention are possible in the light of the above teaching. It is therefore to be understood that within the scope of the appended claims, the present invention may be practiced otherwise than as specifically described.

What is claimed is:

1. A seat comprising:

a seat supporting carrier;

a seat cushion mounted on said seat supporting carrier in such a manner as to pivot on a first pivot axis between an erected position and a laid position, said seat cushion having a front portion and rear portion, said first pivot axis being disposed on the rear portion of said seat cushion;

a swing arm mounted on said seat supporting carrier in such a manner as to pivot on a second pivot axis between an erected position and a laid position, said second pivot axis also being disposed on the rear portion of said seat cushion; and a seat back mounted on said swing arm in such a manner as to pivot on a third pivot axis between an erected position and a laid position, said seat back having an upper portion and a lower portion, said third pivot axis being disposed on the lower portion of said seat back, said seat supporting carrier and said seat back being connected together by said swing arm at said second pivot axis and at said third pivot axis, the lower portion of said seat back and the rear portion of said seat cushion being configured to avoid interference with one another when said swing arm undergoes pivotal movement between the erected position and the laid position.

2. A seat as claimed in claim 1, wherein said second pivot axis is positioned higher than said first pivot axis.

3. A seat as claimed in claim 1, wherein said third pivot axis is positioned higher than said first pivot axis and said second pivot axis when said seat back is in the erected position and said seat cushion is in the laid position.

4. A seat as claimed in claim 1, wherein said first pivot axis and said second pivot axis are disposed in substantially vertical alignment when viewed in side elevation.

5. A seat as claimed in claim 1, wherein said seat back has a back surface portion on which a substantially flat sheet member is provided.

6. A seat as claimed is claim 1, wherein each of said scat back and the said seat cushion has a plurality of mounting portions formed therein, said mounting portions having headrests detachably mountable thereto, said headrests being mounted as appropriate depending on whether said seat back and cushion are in one of erect and laid positions.

7. A seat comprising:

a seat supporting carrier, a seat cushion mounted on said seat supporting carrier in such a mariner as to pivot on a first pivot axis between an erected position and a laid position, said seat cushion having a front portion and a rear portion, said first pivot axis being disposed on the rear portion of said seat cushion;

a swing arm mounted on said seat supporting carrier in such a manner as to pivot on a second pivot axis between an erected poison and a laid position, said second pivot axis also being disposed on the rear portion of said seat cushion; and a seat back mounted on said swing arm in such a manner as to pivot on a third pivot axis between an erected position and a laid position, said seat back having an upper portion and a lower portion, said third pivot axis being disposed on the lower portion of said seat back, said seat supporting carrier and said seat back being connected together by said swing arm at said second pivot axis and at said third pivot axis, the lower portion of said seat back and the rear portion of said seat cushion being configured to avoid interference with one another when said swing arm undergoes pivotal movement between the erected position and the laid position;

wherein when the swing arm is in the erected position the seat can selectively take one of a forward facing position in which the seat cushion is in tire laid position and the seat back is in the erected portion, and a folded position in which the seat cushion is in the laid position and the seat back is in the laid potion overlying the seat cushion; and wherein when the swing arm is in the laid position, the seat can selectively take one of a full-flat position in which the seat cushion is in the laid position and the seat back is in a fully reclined horizontal position, a rear-facing position in which the seat cushion is in the erected position and the seat back is in the fully reclined horizontal position, and an upright position in which the seat cushion is in the erected position and the seat back is in the erected position.

* * * * *